(12) United States Patent
Inoue et al.

(10) Patent No.: US 7,080,947 B2
(45) Date of Patent: Jul. 25, 2006

(54) FUSION-BONDED OPTICAL COMPONENT, A METHOD FOR MANUFACTURING THE FUSION-BONDED OPTICAL COMPONENT, AND MANUFACTURING EQUIPMENT FOR THE SAME

(75) Inventors: Koichi Inoue, Sakura (JP); Hironori Tanaka, Sakura (JP); Isao Suzuki, Sakura (JP); Takaaki Matsuura, Ichihara (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/063,547

(22) Filed: Feb. 24, 2005

(65) Prior Publication Data

US 2005/0185901 A1    Aug. 25, 2005

(30) Foreign Application Priority Data

Feb. 25, 2004   (JP)   ............................ P2004-049692

(51) Int. Cl.
*G02B 6/255* (2006.01)
(52) U.S. Cl. .......................................... 385/95; 385/34
(58) Field of Classification Search ...................... None
See application file for complete search history.

(56) References Cited

U.S. PATENT DOCUMENTS

| 4,962,988 | A  | * | 10/1990 | Swann ........................ 385/34 |
| 6,244,757 | B1 | * | 6/2001  | Kim et al. .................... 385/96 |
| 6,360,039 | B1 |   | 3/2002  | Bernard et al. |
| 6,921,216 | B1 | * | 7/2005  | Li et al. ....................... 385/96 |

FOREIGN PATENT DOCUMENTS

JP             2002-372604 A     12/2002

* cited by examiner

*Primary Examiner*—Sung Pak
(74) *Attorney, Agent, or Firm*—Sughrue Mion, PLLC

(57) ABSTRACT

A fusion-bonded optical component is created using a laser oscillator for irradiating at least one beam of laser light upon optical components, for example an end of a rod lens and an end of an optical fiber. The optical components are fusion-bonded at respective ends. A CCD camera is used for observing a shape change caused by the laser beam irradiation of the ends during the fusion bonding, and a controlling section controls the laser oscillator to form a curved edge in the end portion, the controller controlling the irradiation of the rod lens and optical fiber based at least in part on the observation performed by the CCD camera.

15 Claims, 6 Drawing Sheets

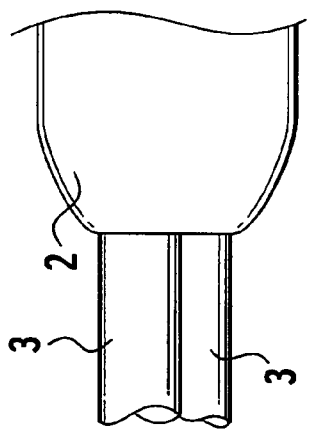
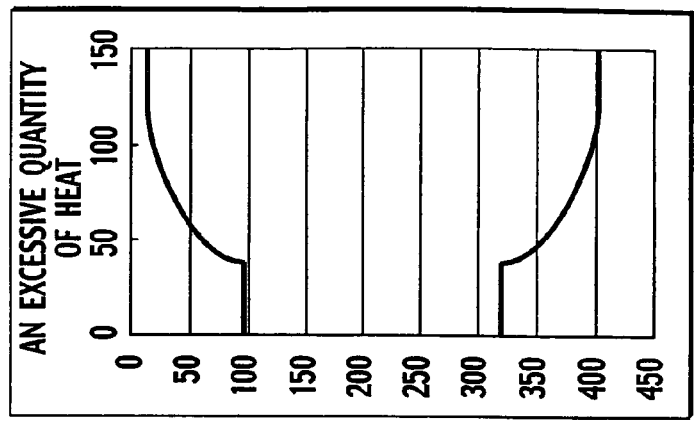
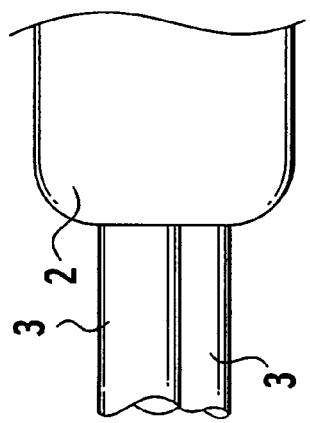
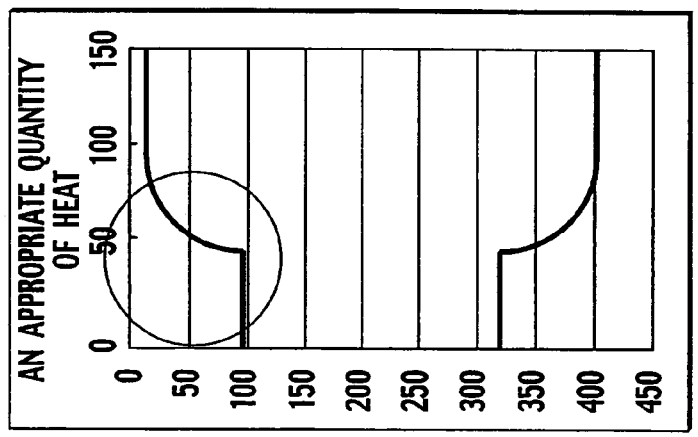
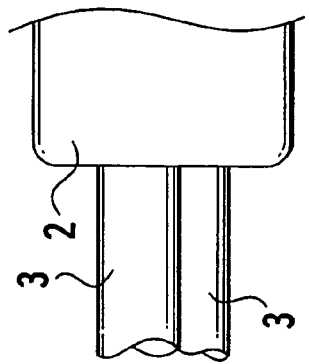
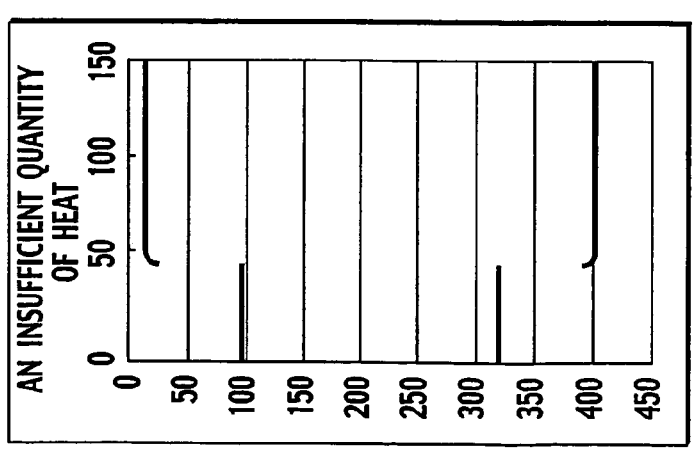

FUSION-BONDED OPTICAL COMPONENT, A METHOD FOR MANUFACTURING THE FUSION-BONDED OPTICAL COMPONENT, AND MANUFACTURING EQUIPMENT FOR THE SAME

CROSS REFERENCE TO RELATED APPLICATION

This application claims benefit of priority under 35 U.S.C. § 119 to Japanese Patent Application No. 2004-49,692, filed on Feb. 25, 2004, the entire contents of which are incorporated by reference herein.

BACKGROUND OF THE INVENTION

1. Field of the Invention

The present invention relates to a fusion-bonded optical component manufactured by fusion-splicing optical components (such as an optical fiber, and/or a rod lens, and/or a prism, and the like) together, a method for manufacturing the fusion-bonded optical component, and manufacturing equipment for the same.

2. Description of the Related Art

Skilled artisans understand that the fields of optics and optical-related components include wide varieties of specific functional elements. Skilled artisans also comprehend that optical functional elements can be provided with somewhat generic terms which encompass all or virtually all of specific optical functional components within the optical field of art. For instance, optical-related components and/or optical functional elements include components/elements such as a rod lens, a prism, and/or the like. Further, optical components/elements may include any number of individual or plural components, including at least one optical functional element and/or at least one optical fiber. Typically, when a plurality of optical components are joined (through fusion-splicing or another attachment method), the attached components are generically described, for example, as a fusion-bonded optical component.

As an example of fusion-bonded optical components, Japanese Patent Application Laid-Open Publication No. 2002-372,604 and U.S. Pat. No. 6,360,039 have disclosed an optical fiber collimator manufactured by fusion-splicing together an optical fiber (a first optical component) and a rod lens (a second optical component).

The above related art has adopted a method in which a laser beam is irradiated to the optical functional element and the optical fiber in order to fusion-splice the two pieces together.

SUMMARY OF THE INVENTION

When fusion-splicing an optical functional element and an optical fiber, if a quantity of laser beam irradiation or the laser irradiation time or the like is insufficient, the optical functional element and the optical fiber may be insufficiently connected together. For instance, consider the potential for an end portion (fused portion) on the optical fiber side of the optical functional element to not have fully dissolved, resulting in a bad and/or weak connection.

In this case, since the fused portion does not have a sufficient tensile strength, when tensile stress is applied to a pigtail portion, the fused portion can rupture, which suggests that the fusion-bonded optical element fails to provide sufficient mechanical reliability.

Although the mechanical reliability can be improved by increasing a quantity of laser beam irradiation or a laser irradiation time, such an increase may lead to excessive dissolution of the optical functional element, which changes optical properties thereof such as the refraction index or the like. Changes in optical properties in turn cause the light distribution curve of the emitting light therefrom to deviate from a Gaussian curve, thereby leading to degradation of optical characteristic of the fusion-bonded optical component.

The present invention has been made in view of the above circumstances. The present invention provides a fusion-bonded optical element having superior optical characteristics and improved mechanical reliability. A method for manufacturing the fusion-bonded optical component, and manufacturing equipment for the same, are also disclosed.

An embodiment of the present invention provides a fusion-bonded optical component comprising a first optical component including at least one optical fiber (various embodiments include a plurality of parallel optical fibers), and a second optical component including an optical functional element having a diameter larger than the diameter of said first optical component, wherein an end of said first optical component is fusion-bonded with an end of said second optical component, and a curved edge is disposed on a shoulder of an end portion of the second optical component adjacent to where said fist and second optical components meet.

The present invention, a curved edge is disposed on an optical component which has a larger diameter than an attached optical component, resulting in an inclination angle as measured by a straight line connecting a first and a second point on the curved edge with respect to a circumferential surface of the attached optical component, wherein the inclination angle falls within a predetermined range, thereby obtaining superior optical characteristics and sufficient fusion strength.

Also, the curved edge is disposed so that an inclination angle of a first imaginary straight line connecting a first point at which a second imaginary straight line intersects with the curved edge and a second point at which a third straight line intersects with the curved edge with respect to the circumferential surface falls within a range from about 40 degrees to about 70 degrees, the second imaginary straight line being parallel to the longitudinal direction of the first optical component and apart from the circumferential surface of the first optical component by one third of the radius difference between the first and the second optical components, and the third imaginary straight line being parallel to the longitudinal direction of the first optical component and apart from the circumferential surface of the first optical component by two thirds of the radius difference, thereby obtaining superior optical characteristics and sufficient fusion strength.

Moreover, since sufficient fusion strength is obtained, a need for performing a screening test for tensile strength is eliminated, thereby reducing a number of production processes.

Furthermore, a need for measuring optical characteristics is eliminated, thereby reducing a number of production processes.

The present invention provides a fusion-bonded optical component having superior optical characteristics and improved mechanical reliability.

BRIEF DESCRIPTION OF THE DRAWINGS

In the accompanying drawings,

FIG. 4A illustrates weakly bonded optical components resulting from an insufficient quantity of heat applied during fusion;

FIG. 4B is a graph showing the curved edge of a second optical component as such relates to the insufficient amount of heat applied as shown in FIG. 4A;

FIG. 4C illustrates a non-limiting embodiment of the present invention where a curved edge is formed on the shoulder of a second optical component through use of an appropriate amount of heat;

FIG. 4D is a graph showing the curved edge of the second optical component shown in FIG. 4C;

FIG. 4E illustrates bonded optical components where too much heat has been applied, resulting hi poor optical transmittance characteristics;

FIG. 4F is a graph showing the curved edge of the second optical component as shown in FIG. 4E;

DESCRIPTION OF THE PREFERRED EMBODIMENTS

Figure 1:
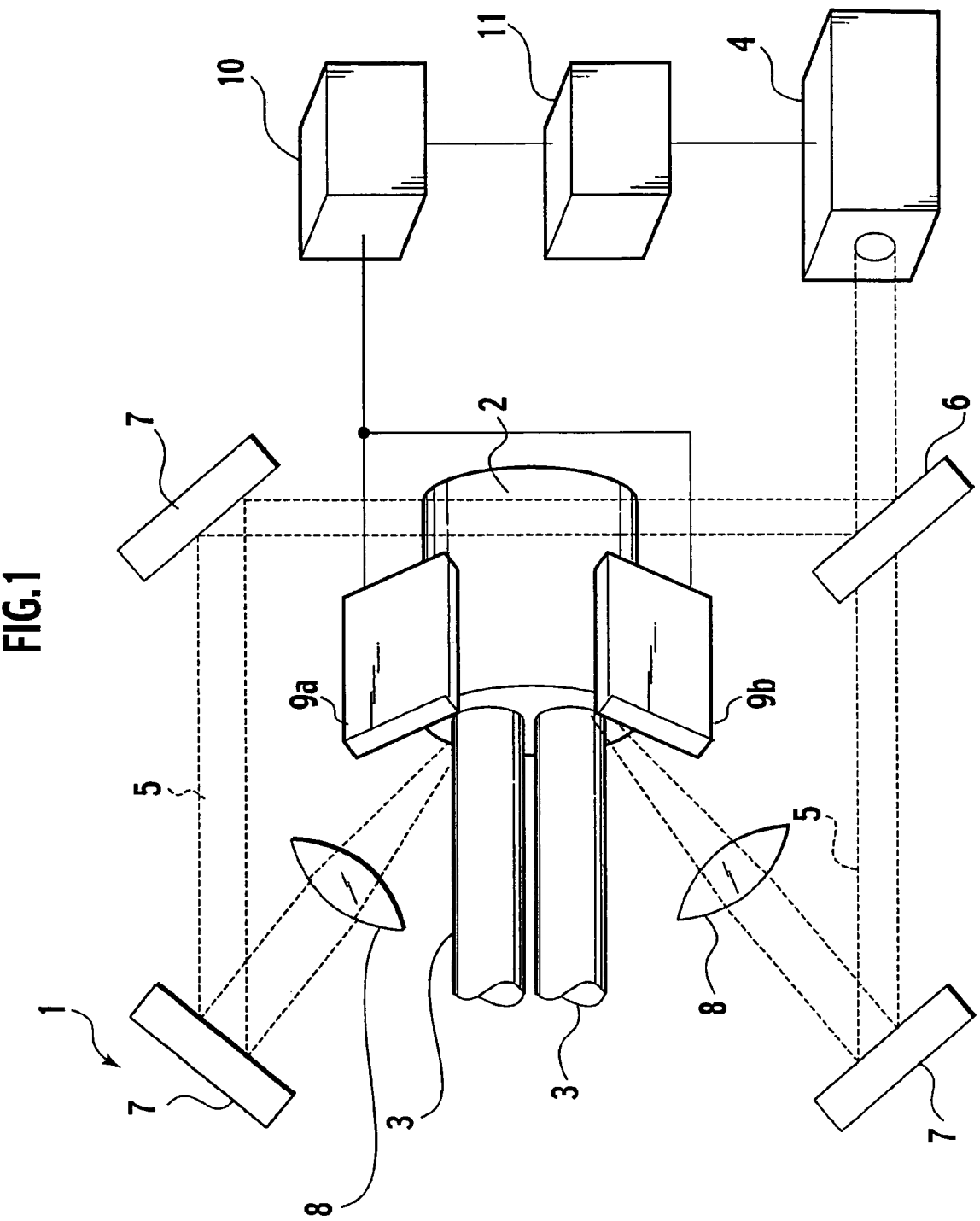
FIG. 1 is a perspective view of manufacturing equipment for a fusion-bonded optical component according to an illustrative, non-limiting embodiment of the present invention.

Referring to the drawings, a fusion-bonded optical element, and a method and manufacturing equipment for making the same are provided.

The present invention is directed to realize both a sufficient tensile strength and superior optical characteristics when fusion-splicing an optical component with another.

The accompanying drawings are used for describing various embodiments, and like reference marks are used throughout to prevent repetition.

FIG. 1 is a schematic diagram of manufacturing equipment 1 for fusion-bonded optical components according to a first embodiment of the present invention.

In the following, the production of an optical fiber collimator as a fusion-bonded optical component will be described. This optical fiber collimator is a device that allows the signal-bearing light propagating through an optical fiber to exit therefrom not as diverging light but as parallel light.

The manufacturing equipment 1 includes a laser oscillator 4 emitting $CO_2$ laser beam 5 (hereinafter called, laser beam 5), a half mirror 6 splitting the laser beam 5 into two beams, a total reflection mirror 7 reflecting totally the laser beam 5, a convergence lens 8 reducing the diameter of the light flux of the laser beam 5, CCD cameras 9a, 9b (hereinafter collectively called, a "CCD camera 9"), a processing section 10 and a controlling section 11.

A rod lens 2 (a second optical component) and two optical fibers 3 (a first optical component) are to be fusion-spliced with each other. The first and second components (constitutional elements of a collimator lens to be produced by the manufacturing equipment 1) are held with a locking jig (not shown) provided in the equipment 1.

The locking jig is movable so that the rod lens 2 and optical fibers 3 are aligned with each other.

Respective ends of parallel optical fibers 3 are disposed so that the end faces thereof oppose and contact the end face of the rod lens 2. Incidentally, the end of the optical fiber 3 is arranged so as to oppose the rod lens 2, and an optical fiber sheath (not shown) is removed to a predetermined extent, thereby exposing an optical fiber core wire.

The half mirror 6 is placed near the laser beam window of the laser oscillator 4 and splits the emitted laser beam 5 into two beams. The total reflection mirror 7 reflects the split laser beams which are guided to the area of contact between the rod lens 2 and the optical fiber 3. The laser beam wavelength is, for example, 10.6 micrometers.

The CCD camera 9 is used to observe a change in the area of contact, in other words, the portion to be fusion-spliced, between the rod lens 2 and optical fiber 3 that is heated and then fused by the irradiation of the laser beam 5.

The processing section 10 quantifies the observation results by the CCD camera 9. The controlling section 11 controls, for instance, an on/off operation of laser irradiation by the laser oscillator 4, laser irradiation time and laser irradiation intensity on the basis of the data quantified by the processing section 10. Also, the controlling section 11 controls the locking jig, in other words, the position of the rod lens 2 and the optical fiber 3.

Observation results of the fusion-spliced portion are described in greater detail herein.

An embodiment of the present invention may include the rod lens 2 being primarily made of quartz glass and with a diameter of about 400 micrometers, whereas the diameter of the optical fiber 3 may be about 125 micrometers. The number of the optical fibers 3 is optional, and may include a plurality of optical fibers or simply one optical fiber.

In an embodiment of the present invention, when fusion-bonding the rod lens 2 and the optical fiber 3, a curved edge is disposed on an end portion of the rod lens 2 in order to obtain sufficient fusion strength. The curved edge is constructed within the parameters described herein so that the edge places no influence on the optical characteristics of the fusion-bonded optical component. The curved edge of the present invention is described in greater detail herein.

Figure 2:
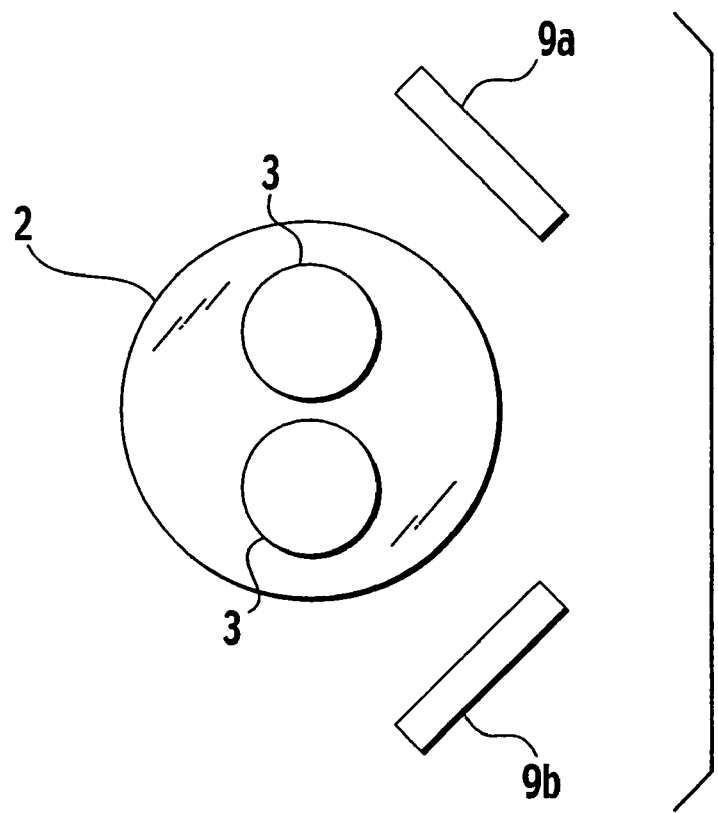
FIG. 2 illustrates a positional relationship among a charge coupled device (CCD) camera, a rod lens and an optical fiber according to a non-limiting embodiment of the present invention.

The CCD cameras 9a, 9b are provided to observe the formation of the curved edge. The CCD cameras 9a, 9b are positioned so as to be able to observe the rod lens 2 and the optical fiber 3 from two different directions that are generally mutually perpendicular, as shown in FIG. 2.

Figure 3:
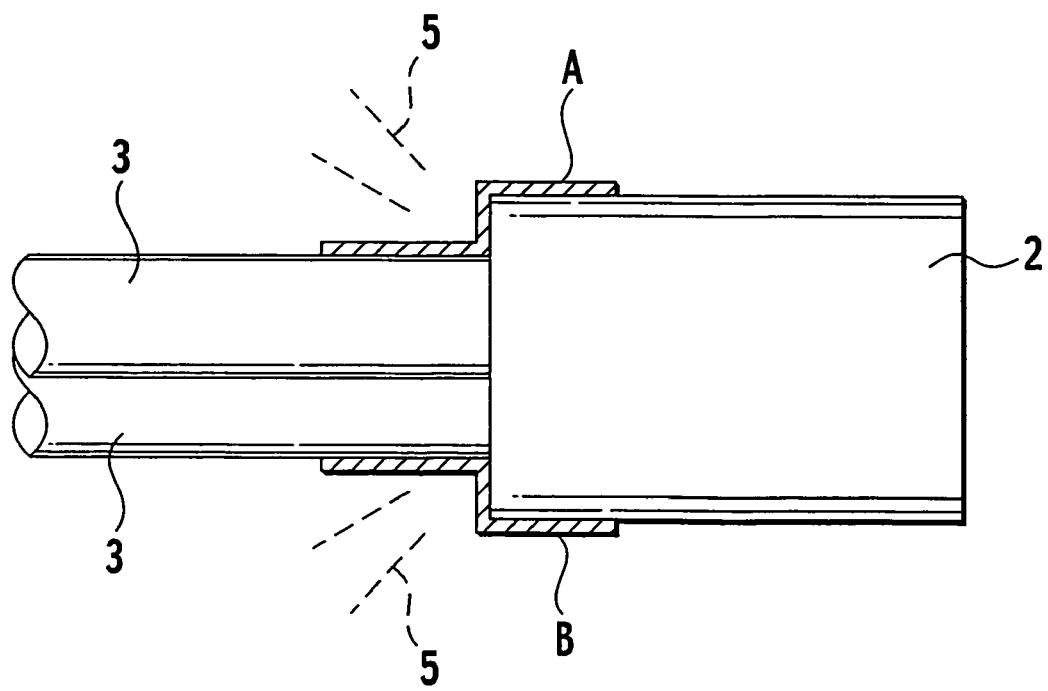
FIG. 3 is a perspective view of the rod lens and the optical fiber according to an illustrative, non-limiting embodiment of the present invention.

Specifically, the CCD cameras 9a, 9b positioned as mentioned above observe the curved edge being formed by capturing change in the shape of portions A and B when the laser beam 5 is irradiated onto the rod lens 2 and the optical fiber 3, as shown in FIG. 3.

FIGS. 4A to 4F illustrate the relation between a quantity of heat supplied by the irradiation of the laser beam and a shape of the fusion-spliced portion. In FIG. 4B, 4D, and 4F, the horizontal and vertical axes are taken as a unit of micrometers.

FIGS. 4A and 4B illustrate the shape of the fusion-bonded portion in the case of an insufficient quantity of heat being applied to the optical components. In this case, the curved portion is insufficiently formed, which may suggest that the rod lens 2 and the optical fiber 3 be not fusion-bonded sufficiently, and that the strength of the fusion-bonded portion is insufficient even if the rod lens 2 and the optical fiber 3 are capable of transmitting optical signals.

In this case, the end portion of the rod lens 2 can be further irradiated by laser beam 5 to appropriately form the curved edge to thereby indicate that the fusion-bonded optical components have achieved sufficient mechanical strength.

FIGS. 4C and 4D illustrate a shape of the fusion-bonded portion in case of an appropriate quantity of heat. In this case, the curved edge is formed into an appropriate shape, thereby obtaining sufficient strength thereof and having no crucial influence on the optical characteristics of the fusion-bonded optical component.

FIGS. 4E and 4F illustrate a shape of the fusion-bonded portion in case of an excessive quantity of heat. In this case, since the end portion of the rod lens 2 is fused excessively, a crucial and undesired influence may occur on the optical characteristics of the fusion-bonded optical component.

A quantity of heat is changeable by adjusting a flux (beam) diameter of the laser beam 5, laser irradiation intensity, laser irradiation time, an irradiation angle, and/or the like. In this embodiment, a laser beam diameter of 3.5 mm or smaller, laser irradiation intensity of about 0.5 to 3.5 watts, laser irradiation time of about 2 to 15 seconds, and an irradiation angle of about 25 to 70 degrees are chosen in order to supply an appropriate quantity of heat to the area of contact between the rod lens 2 and the optical fiber 3.

In this embodiment, an inclination angle of the curved edge is used as a criterion to determine if an appropriate shape is formed as a result of an appropriate quantity of heat.

The inclination angle is measured by the processing section 10 based on image data that the CCD camera 9 (FIG. 1) has collected.

Figure 5:
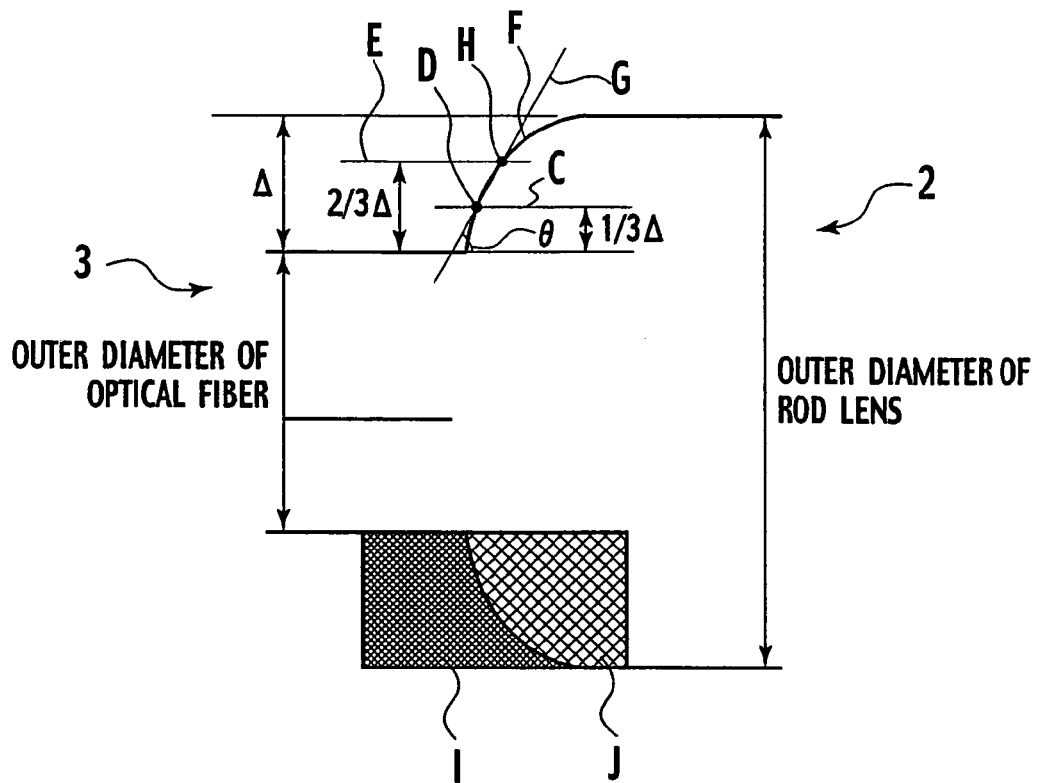
FIG. 5 is an explanatory diagram in which an inclination angle theta is defined in relation to the end portion shape of the rod lens according to an illustrative, non-limiting embodiment of the present invention.

Referring to FIG. 5, the inclination mentioned above will be explained in detail.

The inclination in this embodiment indicates the inclination angle theta of the straight line G connecting points D and H with respect to the circumferential surface of the optical fiber 3.

The point D is a point at which an imaginary straight line C intersects with the curved edge F, the imaginary straight line C being parallel to the longitudinal direction of the optical fiber 3 and located apart from the circumferential surface of the optical fiber 3 by one third of the radius difference (delta/3) between the rod lens 2 and the optical fiber 3.

Here, the radius difference delta means half the value of the difference between the apparent outer diameters of the rod lens and the optical fiber on the image observed by the CCD camera 9. (Note that when it comes to the diameter of the optical fiber 3, two optical fibers are considered as one in this embodiment.)

In addition, the point H is a point at which an imaginary straight line E intersects with the curved edge F, the imaginary straight line E being parallel to the longitudinal direction of the optical fiber 3 and located apart from the circumferential surface of the optical fiber 3 by two thirds of the radius difference (2 delta/3) between the rod lens 2 and the optical fiber 3.

The relation between the shape of the curved edge shown in FIG. 4 and the inclination angle will be explained, referring to FIG. 6.

Figure 6:
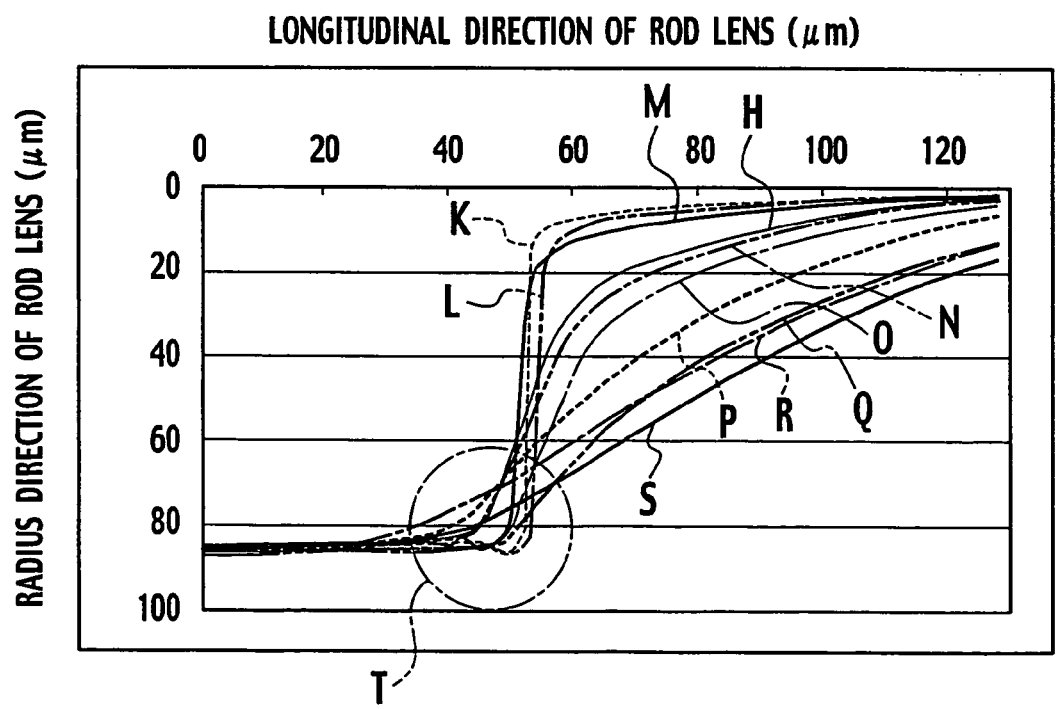
FIG. 6 illustrates various end portion shape depending on laser outputs.

While an appropriate shape is realized in case of an appropriate quantity of heat as indicated by the imaginary line H in FIG. 6, a step-like shape is formed so that the end of the rod lens 2 is still recognizable in case of an insufficient quantity of heat as indicated by the imaginary lines K, L and M, resulting in the inclination angles of about 90 degrees.

On the other hand, in case of an excessive quantity of heat, the end portion of the rod lens 2 is excessively fused as indicated by imaginary lines N, O, P, Q, R and S. As a result, a tapered slope is smoothly formed from the circumferential surface of the optical fiber 3 to that of the rod lens 2, resulting in the inclination angle 30 of degrees (inclusive) to about 40 degrees (exclusive).

An appropriate inclination angle of the curved edge in the end portion of the rod lens 2 is described below.

Figure 7:
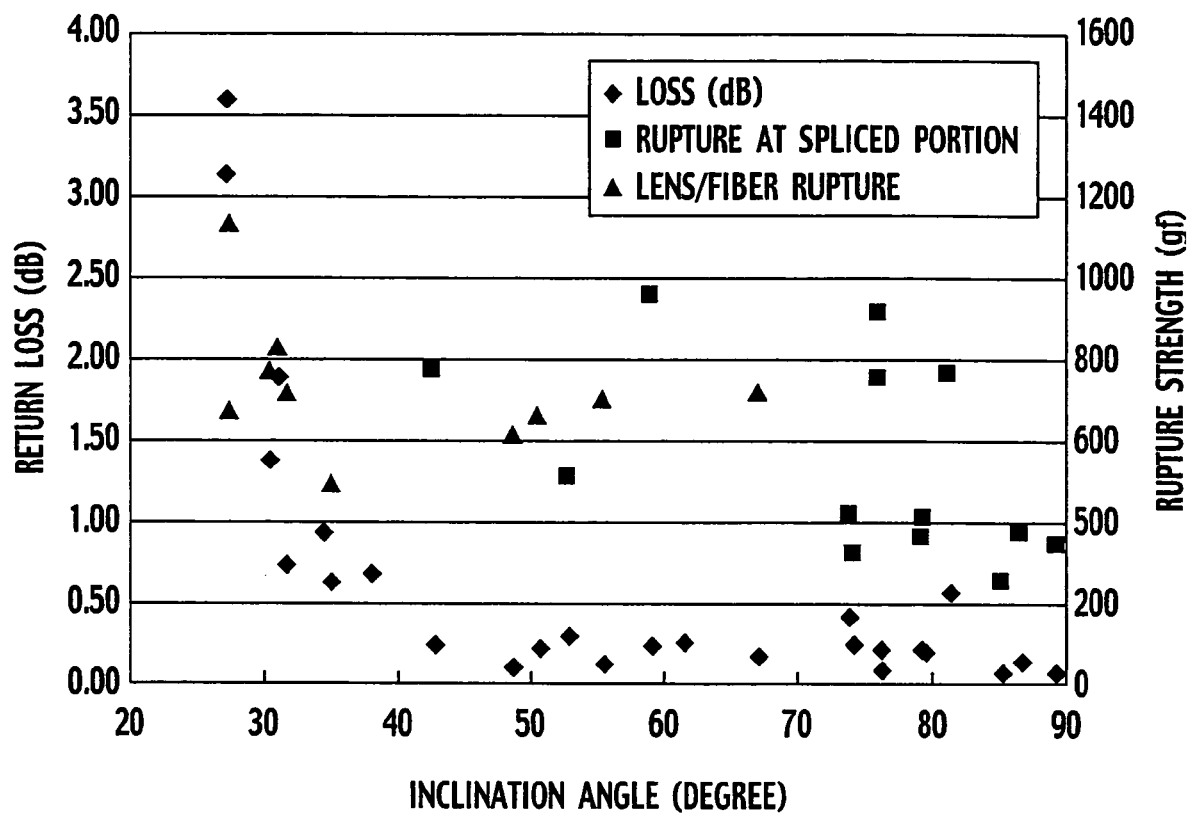
FIG. 7 illustrates an inclination angle dependence of coupling loss and rupture strength in the rod lens shown in FIG. 1.

As shown in FIG. 7, the inclination angle that yields sufficiently low insertion loss (about 0.3 dB or less) is 40 degrees or more.

In addition, an inclination angle of 70 degrees or more most likely results in low tensile strength 450 gf (4.41N) or lower.

Therefore, in order to realize superior optical characteristics while keeping a sufficient tensile strength, the inclination angle of the curved edge in the fusion-spliced portion of the rod lens 2 is considered preferable in a range from about 40 degrees to about 70 degrees.

When the above inclination angle is achieved, sufficient fusion strength is assured and there is no need for performing a screening test for tensile strength, thereby reducing a number of production processes.

Also, a need for an optical characteristics measurement is eliminated, thereby reducing an additional number of production processes.

When the inclination angle measured by the processing section 10 is out of the predetermined range, the controlling section 11 determines that the laser irradiation time or the irradiation intensity has been inappropriate and thereby adjusts the irradiation time, intensity or both in performing the subsequent fusion-splicing.

The above embodiment has described an instance in which a first optical component comprises a rod lens 2 and a second optical component comprises two optical fibers. However, the invention is not limited to this configuration.

Figure 8A:
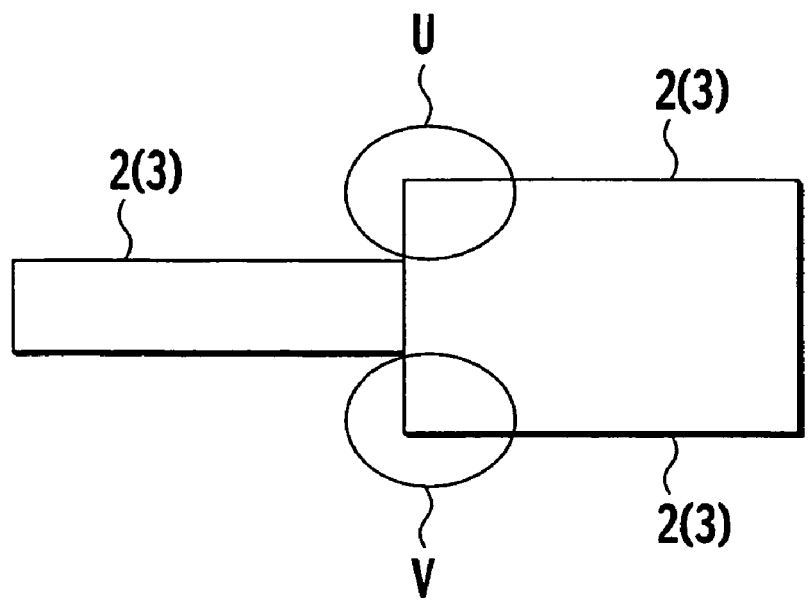
FIGS. 8A and 8B are an explanatory diagram of additional, non-limiting embodiments of the present invention.

For example, the present invention is applicable to a fusion-bonded optical component in which a first and a second optical component includes one rod lens 2 or one optical fiber 3, and/or where the optical components have different diameters, as shown in FIG. 8A. In this case, a shape change of portions U and V is observed.

Figure 8B:
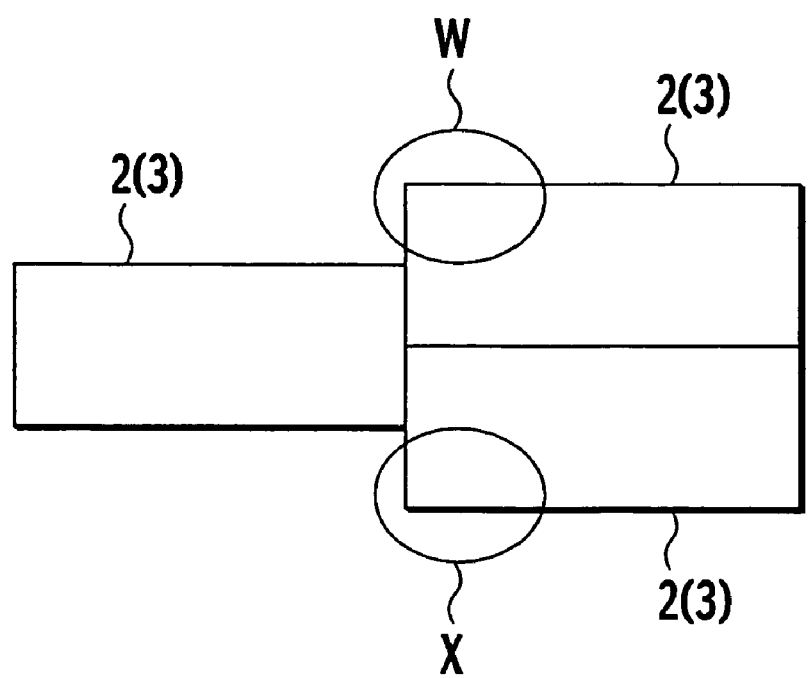

The present invention is also applicable to a fusion-bonded optical component in which a first optical component includes one rod lens 2 or one optical fiber 3 and a second optical component includes at least two parallel rod lenses 2 or at least two parallel optical fibers 3. Also, the present invention is applicable to a fusion-bonded optical component wherein multiple rod lenses 2, and/or all the optical fibers 3, have the same diameter. In this case, a shape change of portions W and X in FIG. 8B should be observed.

In addition, in certain embodiments, when an excessive quantity of heat is supplied to the area of contact of the rod lens 2 and optical fiber 3, an amount of fused mass of the rod lens 2 is increased, and thus the fused portion moves toward the optical fiber 3 being fused, thereby increasing the diameter of the fusion-bonded portion. So, another embodiment of the present invention includes the curved edge having an appropriate shape formed by observing the diameter change of the optical fiber 3 and a quantity of heat can be adjusted based on the observation result.

Further, in additional embodiments, when observing how the rod lens 2 is being fused and determining if an appropriate shape of the curved edge is formed, the inclination angle of the curved edge is used as a criterion. However, the present invention is not limited to a use of the inclination angle as a criterion. Various parameters can be used, if a method capable of quantifying the shape of the end portion of the rod lens 2 is adopted.

For example, a positional relation between points D and H shown in FIG. 5, that is, a distance between the two points, can be used as a criterion for determining if the curved edge is being formed in an appropriate shape.

A change in area ratio of the portions I to J shown in FIG. 5 can also be used as a criterion for determining if the curved edge is being formed into an appropriate shape.

In addition, by focusing on the area surrounded by a circle T in FIG. 6, it is possible to determine if the curved edge is being formed into an appropriate shape based on a degree of an increase of the area or an inclination observed in the area.

Also, manufacturing equipment 1 for a fusion-bonded optical component may be constructed so as to comprise a light source for causing a test light therefrom to enter one end of one of the two optical fibers 3; a reflector for reflecting back the test light that has exited out from the rod lens 2 after traveling through the optical fiber 3 and the rod lens 2 to the other of the two rod lens 2, the reflector facing the end of the rod lens 2 opposite from the optical fiber 3; and a power meter or the like for detecting the light power of the test light that has exited out.

With this configuration, for example, the curved edge can be formed while evaluating the optical characteristics of the rod lens 2.

In addition, prior to fusion-splicing the rod lens 2 and the optical fiber 3, it is possible to tentatively fuse the end portion of the rod lens 2 in advance and then contact the end portion of the lens 2 onto the fiber 3. Also, it is possible to contact both without fusing the rod lens 2 in advance.

The above embodiments illustrate an instance where the laser oscillator 4 is adopted as the fusion-bonding means. However, the equipment 1 can be constructed so as to have an arc-welding machine (or other fusion-inducing equipment) instead of the laser oscillator 4.

The previous description of embodiments is provided to enable a skilled artisan to make and use the present invention. Various modifications to these embodiments will be readily apparent to those skilled in the art, and the generic principles and specific examples provided herein may be applied to other embodiments without the use of inventive facility. For example, some or all of the features of different embodiments discussed about may be deleted from the embodiment. Therefore, the present invention is not intended to be limited to the embodiments described herein but it is to be accorded the widest scope defined only by the claims below and equivalents thereof.

What is claimed is:

1. An optical device comprising:
   a first optical component comprising at least one optical fiber, and
   a second optical component comprising an optical functional element having a diameter larger than a diameter of said first optical component,
   wherein an end of said first optical component is attached to an end of said second optical component, and
   wherein a curved edge is disposed on an end portion of said second optical component adjacent to where said ends meet so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being parallel to a longitudinal direction of said first optical component and apart from a circumferential surface of said first optical component by substantially one-third of a radius difference between said first and said second optical components; said third imaginary straight line being parallel to the longitudinal direction of said first optical component and apart from the circumferential surface of said first optical component by substantially two-thirds of said radius difference.

2. An optical device comprising:
   a first optical fiber, and
   a second optical fiber having a diameter larger than a diameter of said first optical fiber,
   wherein an end of said first optical fiber is attached to an end of said second optical fiber, and
   wherein a curved edge is disposed on an end portion of said second optical fiber adjacent to where said ends meet so that an inclination angle of a first imaginary straight line with respect to a circumferential surface of said first optical fiber falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being parallel to a longitudinal direction of said first optical fiber and apart from a circumferential surface of said first optical fiber by substantially one-third of a radius difference between said first and said second optical fibers; said third imaginary straight line being parallel to the longitudinal direction of said first optical fiber and apart from the circumferential surface of said first optical fiber by substantially two-thirds of said radius difference.

3. An optical device comprising:
   a first optical functional element, and
   a second optical functional element having a diameter larger than a diameter of said first optical functional element,
   wherein an end of said first optical functional element is attached to an end of said second optical functional element; and
   wherein a curved edge is disposed on an end portion of said second optical functional element adjacent to where said ends meet so that an inclination angle of a first imaginary straight line with respect to a circumferential surface of said first optical functional element falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being parallel to a longitudinal direction of said first optical functional element and apart from a circumferential surface of said first optical functional element by substantially one-third of a radius difference between said first and said second optical functional elements; said third imaginary straight line being parallel to the longitudinal direction of said first optical functional element and apart from the circumferential surface of said first optical functional element by substantially two-thirds of said radius difference.

4. An optical device comprising:
a first optical component comprising one optical fiber, and
a second optical component comprising a plurality of substantially parallel optical fibers,
wherein all the individual optical fibers have substantially identical diameters;
wherein an end of said first optical component is attached to an end of said second optical component; and
wherein a curved edged is disposed on an end portion of said second optical component adjacent to where said ends meet so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being parallel to a longitudinal direction of said first optical component and apart from a circumferential surface of said first optical component by substantially one-third of a radius difference between said first and said second optical components; said third imaginary straight line being parallel to the longitudinal direction of said first optical component and apart from the circumferential surface of said first optical component by substantially two-thirds of said radius difference.

5. An optical device comprising:
a first optical component comprising an optical functional element, and
a second optical component comprising a plurality of parallel optical functional elements,
wherein all the optical functional elements have substantially the same diameter;
wherein an end of said first optical component is attached to an end of said second optical component; and
wherein a curved edge is disposed on an end portion of said second optical component adjacent to where said ends meet so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being parallel to a longitudinal direction of said first optical component and apart from a circumferential surface of said first optical component by substantially one-third of a radius difference between said first and said second optical components; said third imaginary straight line being parallel to the longitudinal direction of said first optical component and apart from the circumferential surface of said first optical component by substantially two-thirds of said radius difference.

6. A method for manufacturing an optical device comprised of a first optical component comprising a plurality of substantially parallel optical fibers and a second optical component comprising an optical functional element having a diameter larger than a diameter of said first optical component, wherein an end of said first optical component is attached to an end of said second optical component, comprising:
heating the end of said first optical component and the end of said second optical component to attach said ends together,
observing a shape change caused by the heating of said first and said second optical components, and
forming a curved edge on an end portion of said second optical component adjacent to where said first and second optical components meet based on said observation so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second straight line being parallel to the longitudinal direction of said first optical component and apart from a circumferential surface of said first optical component by substantially one third of a radius difference between said first and said second optical components; and said third imaginary straight line being parallel to the longitudinal direction of said first optical component and apart from the circumferential surface of said first optical component by substantially two thirds of said radius difference.

7. A method for manufacturing an optical component comprised of a first optical fiber and a second optical fiber having a diameter larger than a diameter of said first optical fiber, wherein an end of said first optical fiber is attached to an end of said second optical fiber, comprising:
heating the end of said first optical fiber and the end of said second optical fiber to attach said ends together,
observing a shape change caused by the heating of said first and said second optical fibers, and
forming a curved edge on an end portion of said second optical fiber adjacent to where said first and second optical fibers meet based on said observation so that an inclination angle of a first imaginary straight line with respect to a circumferential surface of said first optical fiber falls within a range from about 40 degrees to about 70 degrees; said first imaginary straight line connecting a first point at which a second imaginary straight line intersects with said curved edge and a second point at which a third imaginary straight line intersects with said curved edge; said second straight line being parallel to the longitudinal direction of said first optical fiber and apart from a circumferential surface of said first optical fiber by substantially one third of a radius difference between said first and said second optical fibers; and said third imaginary straight line being parallel to the longitudinal direction of said first optical fiber and apart from the circumferential surface of said first optical fiber by substantially two thirds of said radius difference.

8. A method for manufacturing an optical component comprised of a first optical functional element and a second optical functional element having a diameter larger than a diameter of said first optical functional element, wherein an end of said first optical functional element is attached to an end of said second optical functional element, comprising:

heating the end of said first optical functional element and the end of said second optical functional element to attach said ends together, observing a shape change caused by the heating of said first and said second optical functional elements, and forming a curved edge on of an end portion of said second optical functional element adjacent to where said first and second optical functional elements meet based on said observation so that an inclination angle of a first imaginary straight line with respect to a circumferential surface of said first optical functional element falls within a range from about 40 degrees to about 70 degrees; said first imaginary straight line connecting a first point at which a second imaginary straight line intersects with said curved edge and a second point at which a third imaginary straight line intersects with said curved edge; said second straight line being parallel to the longitudinal direction of said first optical functional element and apart from a circumferential surface of said first optical functional element by substantially one third of a radius difference between said first and said second optical functional elements; and said third imaginary straight line being parallel to the longitudinal direction of said first optical functional element and apart from the circumferential surface of said first optical functional element by substantially two thirds of said radius difference.

9. A method for manufacturing an optical device comprised of a first optical component comprising one optical fiber and a second optical component comprising a plurality of substantially parallel optical fibers, wherein all the optical fibers have substantially an identical diameter and an end of said first optical component is attached to an end of said second optical component, comprising:

heating the end of said first optical component and the end of said second optical component to attach said ends together, observing a shape change caused by said heating of said first and said second optical components, and forming a curved edge on an end portion of said second optical component adjacent to where said first and second optical components meet based on said observation so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second straight line being parallel to the longitudinal direction of said first optical component and apart from a circumferential surface of said first optical component by substantially one third of a radius difference between said first and said second optical components; and said third imaginary straight line being parallel to the longitudinal direction of said first optical component and apart from the circumferential surface of said first optical component by substantially two thirds of said radius difference.

10. A method for manufacturing an optical device comprised of a first optical component comprising one optical functional element and a second optical component comprising a plurality of substantially parallel optical functional elements, wherein all the optical functional elements have a substantially identical diameter, and an end of said first optical component is attached to an end of said second optical component, the method comprising:

heating the end of said first optical component and the end of said second optical component to attach said ends together, observing a shape change caused by said heating, and forming a curved edge on an end portion of said second optical component adjacent to where said first and second optical components meet based on said observation so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second straight line being parallel to the longitudinal direction of said first optical component and apart from a circumferential surface of said first optical component by substantially one third of a radius difference between said first and said second optical components; and said third imaginary straight line being parallel to the longitudinal direction of said first optical component and apart from the circumferential surface of said first optical component by substantially two thirds of said radius difference.

11. Manufacturing equipment for making an optical device comprised of a first optical component comprising a plurality of substantially parallel optical fibers and a second optical component comprising an optical functional element having a diameter larger than a cumulative diameter of said plurality of substantially parallel optical fibers, wherein an end of said first optical component is attached to an end of said second optical component, the manufacturing equipment comprising:

a fusion bonder configured to heat the end of said first optical component and the end of said second optical component to attach said ends together, a sensor configured to observe a shape change caused by said heating of said first and said second optical components, and a controller configured to control said fusion bonder based at least in part on the observation by said sensor so as to form a curved edge on an end portion of said second optical component adjacent to where said first and second optical components meet so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being substantially parallel to the longitudinal direction of said first optical component and apart from the circumferential surface of said first optical component by substantially one third of a radius difference between said first and said second optical components; and said third imaginary straight line being substantially parallel to the longitudinal direction of said first optical component and apart from the circumferential surface of said first optical component by substantially two thirds of said radius difference.

12. Manufacturing equipment for making a fusion-bonded optical component comprised of a first optical fiber and a second optical fiber having a diameter larger than the diameter of said first optical fiber, wherein an end of said first optical fiber is attached with an end of said second optical fiber, comprising:

- a fusion bonder configured to heat the end of said first optical fiber and the end of said second optical fiber to attach said ends together,
- a sensor configured to observe a shape change caused by the heating of said first and said second optical fibers, and
- a controller configured to control said fusion bonder based at least in part on the observation by said sensor so as to form a curved edge on an end portion of said second optical fiber adjacent to where said first and second optical fibers meet so that an inclination angle of a first imaginary straight line with respect to a circumferential surface of said first optical fiber falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being substantially parallel to the longitudinal direction of said first optical fiber and apart from the circumferential surface of said first optical fiber by substantially one third of a radius difference between said first and said second optical fibers; and said third imaginary straight line being substantially parallel to the longitudinal direction of said first optical fiber and apart from the circumferential surface of said first optical fiber by substantially two thirds of said radius difference.

13. Manufacturing equipment for making a fusion-bonded optical component comprised of a first optical functional element and a second optical functional element having a diameter larger than the diameter of said first optical functional element, wherein an end of said first optical functional element is attached with an end of said second optical functional element, the manufacturing equipment comprising:

- a fusion bonder configured to heat the end of said first optical functional element and the end of said second optical functional element to attach said ends together,
- a sensor configured to observe a shape change caused by the heating said first and said second optical functional elements, and
- a controller configured to control said fusion bonder based at least in part on the observation by said sensor so as to form a curved edge on an end portion of said second optical functional element adjacent to where said first and second optical functional elements meet so that an inclination angle of a first imaginary straight line with respect to a circumferential surface of said first optical functional element falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being substantially parallel to the longitudinal direction of said first optical functional element and apart from the circumferential surface of said first optical functional element by substantially one third of a radius difference between said first and said second optical functional elements; and said third imaginary straight line being substantially parallel to the longitudinal direction of said first optical functional element and apart from the circumferential surface of said first optical functional element by substantially two thirds of said radius difference.

14. Manufacturing equipment for making a fusion-bonded optical component comprised of a first optical component comprising one optical fiber and a second optical component comprising a plurality of substantially parallel optical fibers, wherein all the optical fibers have substantially the same diameter and an end of said first optical component is attached with an end of said second optical component, the manufacturing equipment comprising:

- a fusion bonder configured to heat the end of said first optical component and the end of said second optical component to attach both of said ends,
- a sensor configured to observe a shape change caused by the heating, and
- a controller configured to control said fusion bonder based at least in part on the observation by said sensor so as to form a curved edge on an end portion of said second optical component adjacent to where said first and second optical components meet so that an inclination angle of a first imaginary straight line with respect to a circumferential surface of said first optical component falls with a range from about 40 degrees to about 70 degrees; said first imaginary straight line connecting a first point at which a second imaginary straight line intersects with said curved edge and a second point at which a third imaginary straight line intersects with said curved edge; said second imaginary straight line being substantially parallel to the longitudinal direction of said first optical component and apart from the circumferential surface of said first optical component by substantially one third of a radius difference between said first and said second optical components; and said third imaginary straight line being substantially parallel to the longitudinal direction of said first optical component and apart from the circumferential surface of said first optical component by substantially two thirds of said radius difference.

15. Manufacturing equipment for making a fusion-bonded optical device comprised of a first optical component comprising one optical functional element and a second optical component comprising a plurality of parallel optical functional elements, wherein all the optical functional elements have substantially the same diameter and an end of said first optical component is attached with an end of said second optical component, the manufacturing equipment comprising:

- a fusion bonder configured to heat an end of said first optical component and the end of said second optical component to attach said ends together,
- a sensor configured to observe a shape change caused by the heating, and
- a controller configured to control said fusion bonder based at least in part on the observation by said sensor so as to form a curved edge on an end portion of said second optical component adjacent to where said first and second optical components meet so that an inclination angle of a first imaginary straight line with respect to a circumferential surface of said first optical component falls within a range from about 40 degrees to about 70 degrees; said first imaginary straight line connecting a first point at which a second imaginary straight line intersects with said curved edge and a second point at which a third imaginary straight line intersects with said curved edge; said second imaginary straight line being substantially parallel to the longitudinal direction of said first optical component and apart from the circumferential surface of said first optical component by substantially one third of a radius difference between said first and said second optical components; and said third imaginary straight line being substantially parallel to the longitudinal direction of said first optical component and apart from the circumferential surface of said first optical component by substantially two thirds of said radius difference.

* * * * *